July 4, 1972   D. W. HOWARD ET AL   3,674,320
ADAPTIVE BRAKING CONTROL SYSTEM
Filed July 15, 1970   3 Sheets-Sheet 1

INVENTORS
DONALD W. HOWARD
GEORGE B. HICKNER
BY Plante, Hartz, Smith & Thompson
ATTORNEYS INVENTORS
DONALD W. HOWARD
GEORGE B. HICKNER
BY Plante, Hartz, Smith & Thompson
ATTORNEYS

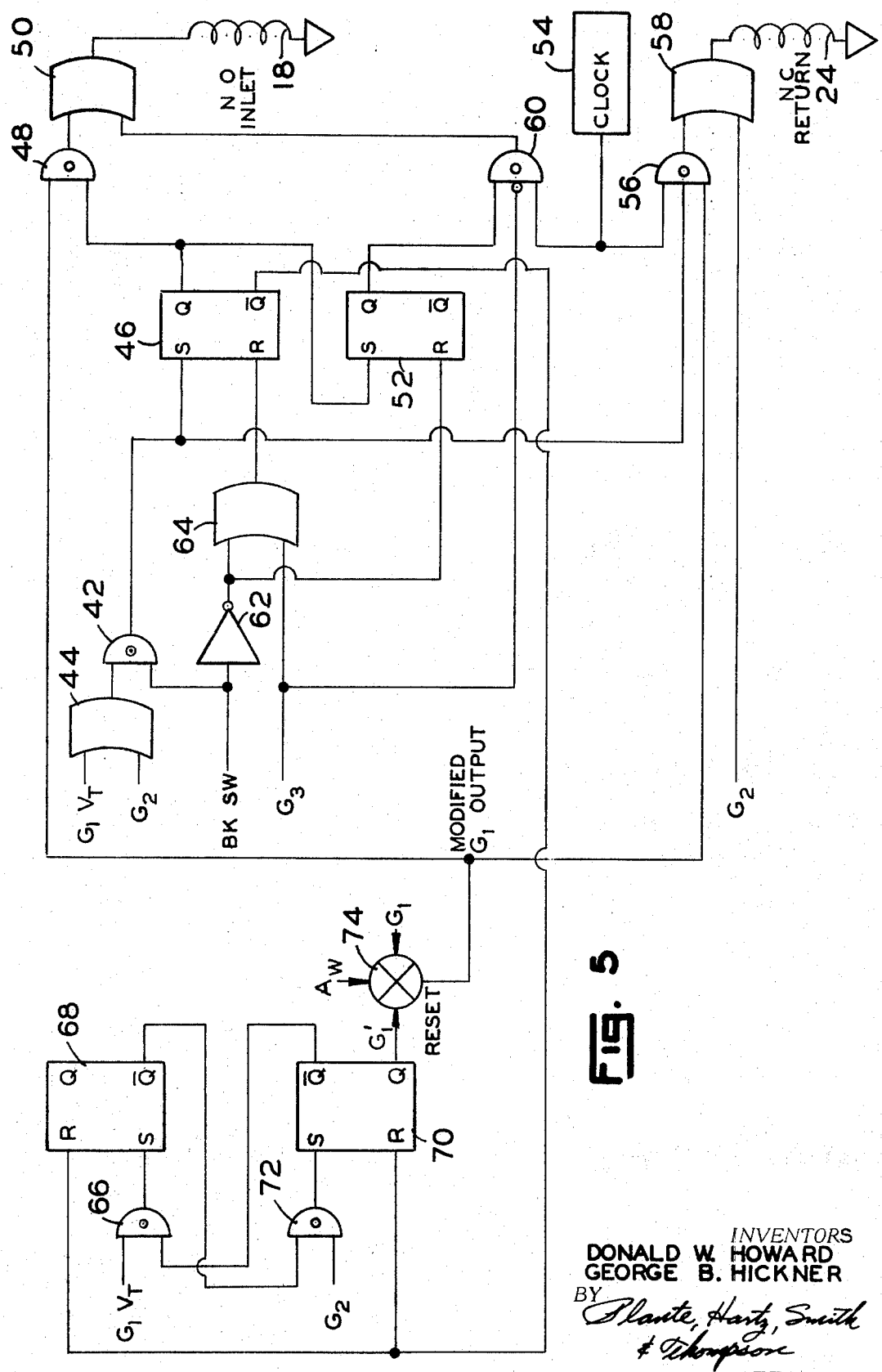

United States Patent Office 3,674,320
Patented July 4, 1972

1

3,674,320
ADAPTIVE BRAKING CONTROL SYSTEM
Donald W. Howard and George B. Hickner, South Bend, Ind., assignors to The Bendix Corporation
Filed July 15, 1970, Ser. No. 54,941
Int. Cl. B60t 8/12
U.S. Cl. 303—21 P                            15 Claims

ABSTRACT OF THE DISCLOSURE

An adaptive braking system on an automotive vehicle for controlling brake pressure. From a signal that represents angular velocity of the wheels, a control unit generates a signal that represents wheel acceleration or deceleration. If the deceleration exceeds certain values or the acceleration exceeds a given value, the control logic will vary the brake pressure to give multiple build and decay rates of pressure in the wheel cylinder.

BACKGROUND OF THE INVENTION

This invention relates to an adaptive braking system on an automotive vehicle similar to the one shown in U.S. Pat. No. 3,499,689. More particularly, it relates to the control unit in an adaptive braking system that has multiple build and decay rates of pressure in the wheel cylinder.

At the present time the automotive industry is spending a large amount of funds to prevent the skidding condition of automotive vehicles. Many different methods are being tried to prevent the skidding of the vehicle during a braking application by a motor vehicle operator sufficient to cause the wheels to lock with a resultant skid condition. One method that is being utilized today is to modulate the brake pressure when a skid condition is apparent. However, problems still arise when high coefficient and low coefficient surfaces are modulated in the same manner. If the high coefficient surface is modulated so that a minimum stopping distance can be obtained, then the automotive vehicle would skid on a lower coefficient surface. If the brakes were modulated so the automotive vehicle would not skid on a low coefficient surface, then a tremendous amount of the braking effort on a high coefficient surface woud be lost with a significant increase in stopping distance. In order to decrease the stopping distance on both low and high coefficient surfaces, and to increase the lateral stability of the vehicle, it is desirable to have multiple build and decay rates in brake pressure. One build and decay rate would apply to high coefficient surfaces with the other build and decay rate applying to low coefficient surfaces.

SUMMARY OF THE INVENTION

Accordingly, it is an object of this invention to provide a control unit of an adaptive braking system that has multiple build and decay rates of brake pressure in the wheel cylinder.

It is a further object of this invention to provide an electronic control unit in a hydraulically operated brake system that has a modulator for controlling pressure in the wheel cylinder, the modulator having a control input and output.

It is a still further object of this invention to provide the logic circuit of a control unit for controlling the inlet and return valves of the modulator which, in turn, controls the brake pressure in the wheel cylinder.

It is an even further object of this invention to provide a control unit in an adaptive braking system that utilizes two deceleration signals and one acceleration signal to control the inlet solenoid and return solenoid of a brake pressure modulator varying the pressure in the wheel cylinder in such a manner that one rate of modulation would apply for low coefficient surfaces and another rate of modulation would apply for high coefficient surfaces.

It is another object of this invention to illustrate a computer logic configuration of the control unit in an adaptive braking system that utilizes two deceleration and one acceleration set points and an integration cycle to control modulation means that varies the pressure in the wheel cylinder.

BRIEF DESCRIPTION OF THE DRAWINGS

FIG. 5 is an illustrated logic diagram of the digital section of the electronic control unit shown in FIG. 2 and mentioned in FIG. 3.

DESCRIPTION OF THE PREFERRED EMBODIMENTS

Figure 1:
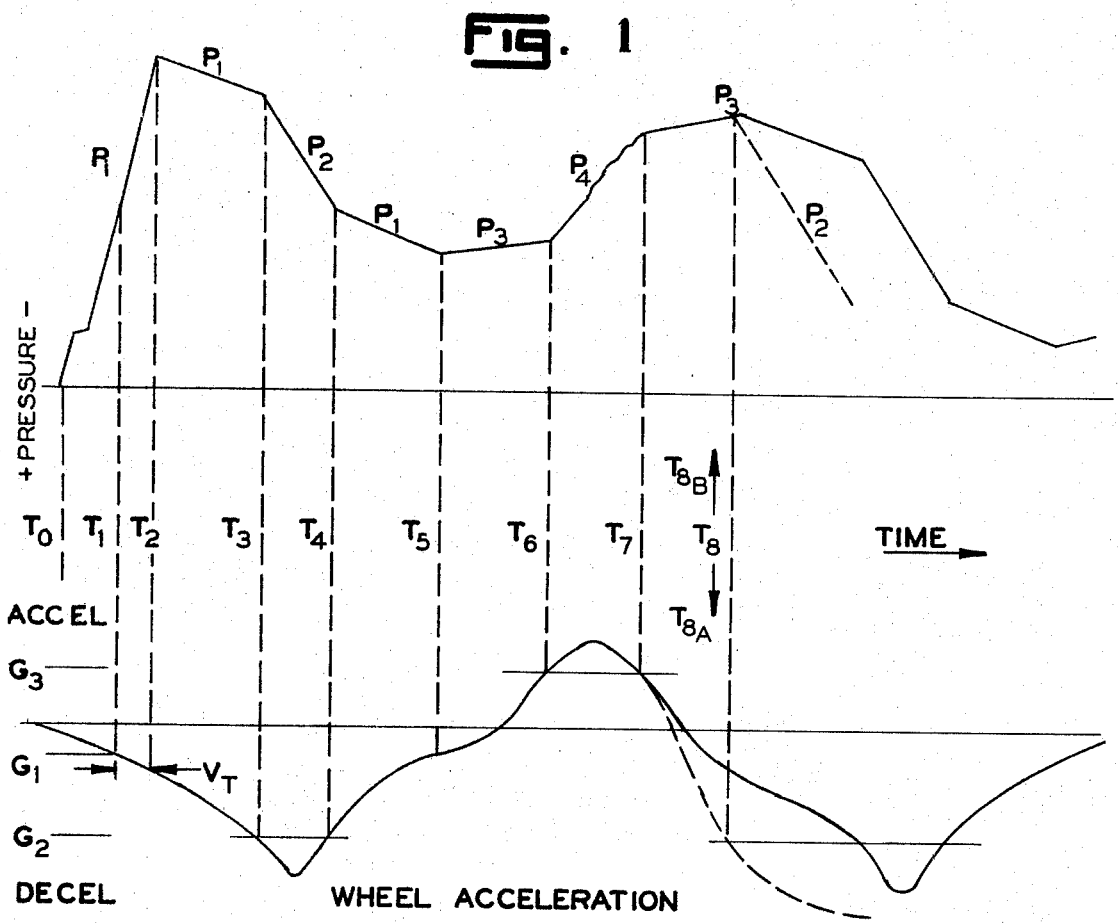
FIG. 1 is a graphic illustration of the wheel brake pressure during a hard braking application sufficient to cause skidding in normal vehicles and wheel acceleration-deceleration plotted on the same time scale.
Figure 2:
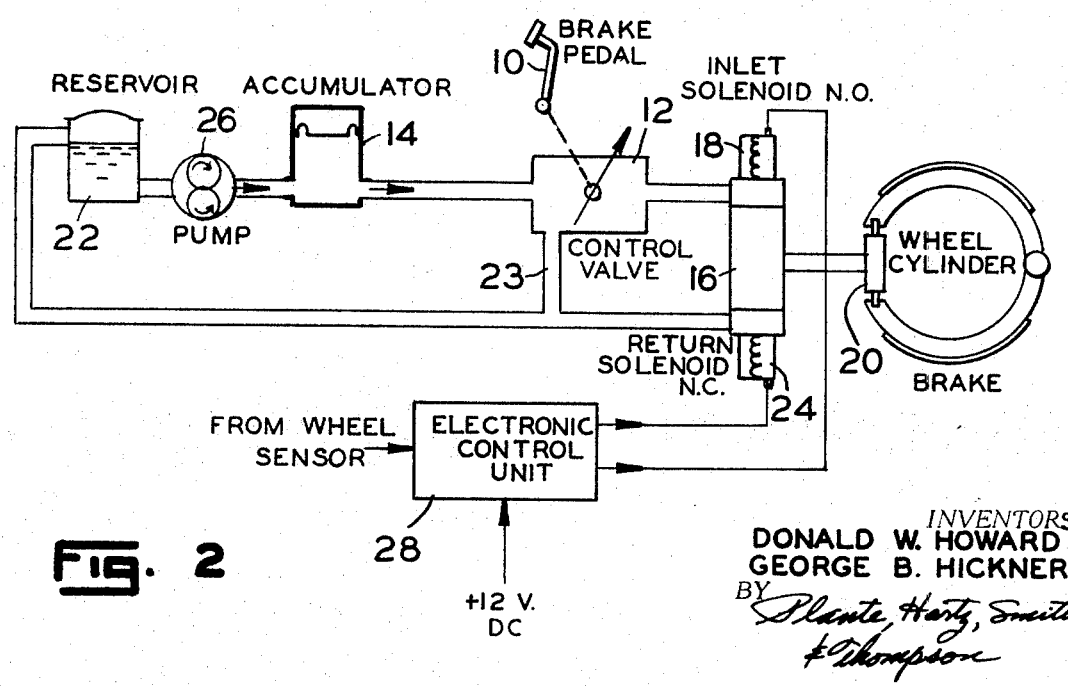
FIG. 2 is a pictorial illustration of an adaptive braking system.

Referring to the figures wherein like numerals refer to like elements and referring particularly to FIG. 1, there is shown a wheel pressure variation and a wheel acceleration-deceleration variation with respect to time when an imminent skid condition is sensed in an adaptive braking system as will be described subsequently. An illustrative example of an adaptive braking system that can vary pressure as shown in FIG. 1 can be seen in FIG. 2. Upon application of the brake pedal 10 the control valve 12 is open. This allows pressurized fluid from the accumulator 14 to flow into modulator 16 through the solenoid controlled valve 18. From the modulator 16 the pressurized fluid flows to the wheel cylinder 20 and upon release of either the brake pedal 10 or the modulator 16 due to an apparent skid condition, the pressurized fluid will return to reservoir 22 through return solenoid 24 or through the control valve bypass line 23. Pump 26 recharges the accumulator 14 from the reservoir 22. The electronic control unit 28 controls the input solenoid 18 and the return solenoid 24 in such a manner that when a skid condition is imminent, the modulator 16 will release brake pressure from wheel cylinder 20. The inputs to the electronic control unit 28 consist of signals from the wheel speed sensor or sensors that represent the rotational velocity of the vehicle wheel. The voltage supplied to the electonic control unit 28 is a voltage from the normal 12 volt DC supply in a typical automotive vehicle. However, it must be regulated in most computer logic applications, such as the one shown in this application.

Figure 3:
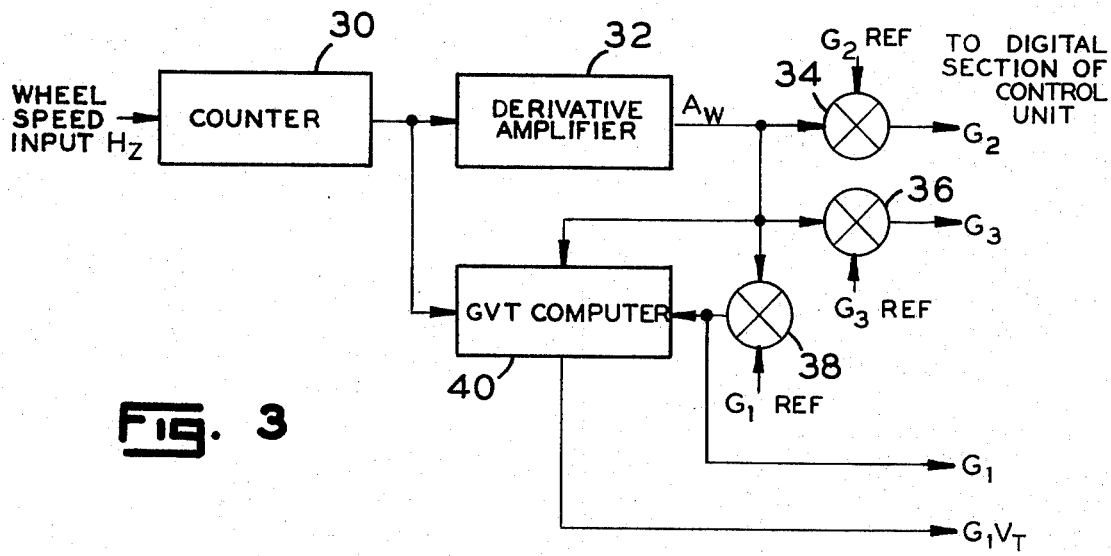
FIG. 3 is a block diagram of a portion of the electronic control unit shown in FIG. 2.

Referring now to FIG. 3, there is shown a portion of the electronic control unit 28. A wheel speed input causes a voltage pulse of a varying frequency and magnitude that represents the rotational velocity of the wheel, the voltage being fed into a counter 30. The output of the counter 30 is converted by a derivative amplifier 32 into a voltage level that is directly proportional to the acceleration or deceleration of the vehicle wheel. The output of the derivative amplifier 32 is fed into a $G_2$ reference comparator 34, $G_3$ reference comparator 36, and $G_1$ reference comparator 38. The $G_1$ and $G_2$ reference comparators 34 and 38 generate two voltages, the lower being when the $G_1$ reference comparator voltage has been reached by the derivative amplifier output, and represents a lower deceleration rate of the vehicle wheel. The $G_2$ reference comparator 34 generates a signal which represents a high voltage signal from the derivative amplifier 32 and is representative of a greater deceleration rate than $G_1$ reference comparator 38. The $G_3$ reference comparator 36 generates a signal which is representative of an acceleration voltage wherein the vehicle wheel is accelerating at a given rate. During a brake application, if the output of the derivative amplifier 32 reaches the $G_1$ reference voltage, the comparator 38 will give a $G_1$ output. The $G_1$ reference voltage indicates that the wheels of the vehicle are approaching a skid condition.

Also, the $G_1$ output of the reference comparator 38 is fed into a GVT computer 40 as described in U.S. patent application Ser. No. 16,166, filed on Mar. 30, 1970, which is hereby incorporated by reference. The GVT computer 40 integrates the output of the derivative amplifier 32 when triggered by the $G_1$ output of the $G_1$ reference comparator 38. In a hard brake application on a high coefficient surface, the $G_1$ deceleration signal is received first, and after a short integration time, the $G_1VT$ voltage will be received. Assuming the wheel continues to decelerate at a greater rate after the $G_1$ signal is received until a voltage level output of the derivative amplifier 32 is reached that corresopnds with the $G_2$ reference point, then the $G_2$ reference comparator 34 will give the $G_2$ output. The $G_2$ reference comparator output will relieve all pressure at the wheel cylinder 20 and as will be subsequently described. After release of brake pressure in the wheel cylinder 20 and the wheel starts to accelertae to a point where the output of derivative amplifier 32 exceeds the $G_3$ reference voltage, then the output of the $G_3$ reference comparator 36 will give the $G_3$ output. These outputs $G_1$, $G_2$, $G_3$ and $G_1VT$ are fed into the digital section of the control unit 28.

Before proceeding to explain the digital section of the control unit as shown in FIG. 5, a general explanation of the logic is in order. The control cycle logic is to vary the brake pressure cycle as a function of wheel velocity and wheel acceleration. Two pressure decay rates, as well as one controlled build rate, are possible. A second build rate, which is a function of pedal force and unbalanced pressure between the master cylinder and brake cylinder, is also available. Other build and decay rates would be possible with increased circuitry. The control of brake pressure in wheel cylinder 20 is effected by inlet solenoid 18 or return solenoid 24. The inlet solenoid 18, which is a normally open valve, is located in the supply line while a second normally closed valve, which is return solenoid 24, is located in the return line. The valves 18 and 24 can be energized to give one or the other valve positions. Also, the valves 18 and 24 can be pulsed on or off to achieve intermediate pressure rates.

Going back to FIG. 1, an explanation will be given that illustrates the relationship between wheel behavior and brake pressure when adaptive braking control is demanded. At time $T_0$ the brake pedal 10 is depressed causing brake pressure to rise sharply at a rate $P_1$. The rate $P_1$ is a function of the driver input. At time $T_1$ a negative value of wheel acceleration is acquired which initiates an integration whose output is a velocity-time product and is designated as $G_1VT$. The $G_1VT$ product is described in previously mentioned U.S. patent application Ser. No. 16,166. When the $G_1VT$ requirement is met, brake pressure is decayed at a slow rate $P_1$. If the wheel acceleration becomes more negative (deceleration) and exceeds the value of $G_2$, pressure is decayed at a faster rate $P_2$. This fast rate persists until the negative acceleration of the wheel falls below the value of $G_2$ at time $T_4$ whereon the rate becomes $P_1$ again. The pressure change rate $P_1$ remains until the wheel acceleration falls below $G_1$ and is tending in the positive acceleration direction. At this time $T_5$ the brake pressure increases at a slow rate $P_3$. If the wheel acceleration exceeds $G_3$, a large positive acceleration value, then pressure is rapidly increased at a rate $P_4$. This rate $P_4$ is a function of the pressure differential between the wheel cylinder brake pressure and the upstream input pressure. This rate $P_4$ occurs until wheel acceleration falls below $G_3$ as indicated by time interval between $T_6$ and $T_7$. At time $T_7$ the pressure build rate is reduced to the previously mentioned slow build rate $P_3$ and continues until $G_1VT$ is obtained at time $T_8$.

If $G_2$ occurs before the time interval required to obtain $G_1VT$ as represented by the dashed acceleration curve of FIG. 1, which could occur on low coefficient road surfaces, the pressure will immediately decay at the fast rate $P_2$. Pressure rate $P_2$ is also shown in dotted line for the pressure curve. The various pressure rates are obtained by either pulsing the solenoid valves 18 and 24 at a specified frequency and duty cycle, or by energizing the solenotid valves 18 and 24. Table 1 summarizes the relationship between the wheel reference points $G_1$, $G_2$, $G_3$ and GVT and the pressure rates. The states of the solenoid valves 18 and 24 are also given.

TABLE I.—CONTROL CYCLE LOGIC

| Wheel characteristic | Inlet solenoid N.O. | Return solenoid N.C. | Pressure rate |
|---|---|---|---|
| $\overline{G_1VT}$ or $\overline{G_2}$ | 0 | 0 | $P_i$ [1] |
| $G_1VT$ to $G_2$ | 1 | p | $P_1$ |
| $G_2$ | 1 | 1 | $P_2$ |
| $\overline{G_2}$ to $G_1$ | 1 | p | $P_1$ |
| $G_1$ to $G_3$ | p | 0 | $P_3$ |
| $G_3$ | 0 | 0 | $P_i$ [2] |
| $\overline{G_3}$ to $G_1VT$ or $G_2$ | p | 0 | $P_3$ |

REPEAT CYCLE

[1] $P_i$ function initial pedal rate.
[2] $P_4$ function of unbalanced pressure differential between wheel cylinder and source.

REMARKS.—0 = Solenoid valve de-energized. p = Solenoid valve pulse modulated. 1 = Solenoid valve energized.

FIG. 3, as has been previously described, gives the desired $G_1$, $G_2$, $G_3$ set points and $G_1VT$, plus the angular acceleration $A_w$ of the wheel which is the output signal of the derivative amplifier 32. FIG. 5 is a functional block diagram of the digital section of the electronic control unit 28. The diagram is drawn based upon positive logic symbolism. The input signals—$G_1$, $G_2$, $G_3$, $G_1VT$ and a brake switch BK SW that indicates a brake application—assume a one logic level when a positive signal is received. It should be realized that negative logic could be used and the actual schematic diagram in FIG. 5 combines functions and uses, in some cases, inverted negative logic to minimize the number of components and increase economy.

Prior to the application of the brake pedal 10 to effect a vehicle deceleration or stop, all inputs to the digital section reside at zero logic level. Both solenoid valves 18 and 24 are de-energized. When sufficient force to the brake pedal 10 is applied, an adaptive braking action is required and the following sequence of events takes place (continually refer back to the description of FIG. 1 and Table 1).

Pushing the brake pedal 10 initiates a conventional switch to give a brake switch BK SW input of one. The brake pressure is applied through the normally open inlet solenoid valve 18 and the wheel starts to decelerate. At some point in time $G_1$ is aquired and initiates the $G_1VT$ integration. The integration time varies with both the initial $G_1$ deceleration speed and with the magnitude of the wheel deceleration. When $G_1VT$ occurs, both inputs to AND gate 42 (FIG. 5) are at one level because BK SW is one and $G_1VT$ is fed through OR gate 44 into the other input of AND gate 42. Therefore, the output of the AND gate 42 sets flip-flop 46 thereby raising the output 3 to a logic level of one. For the time being, assume that the modified $G_1$ output is available. Then AND gate 48 has both inputs at a logic level of one and, consequently, an output of logic level one. The output of AND gate 48 meets through OR gate 50 to drive the normally open input solenoid 18. Depending upon the circuit design configuration, and the requirement of the inlet solenoid 18, various power amplification requirements may be necessary between OR gate 50 and normally open solenoid 18. With the inlet solenoid 18 energized, this closes the inlet valve from the control valve 12 and prevents further pressure increase in wheel cylinder 20.

If the stop is initiated on a low coefficient surface, since the brake torque will far exceed the road torque, the $G_1VT$ integration will result in a very high pressure at the wheel due to the integration time and, consequently, cause the wheel to achieve a very steep deceleration rate. To overcome this situation the second level of wheel deceleration $G_2$ is also fed into OR gate 44 and, subsequently, into AND gate 42. Since $G_2$ can occur more rapidly than $G_1VT$ for these conditions, the pressure build-up in the wheel cylinder 20 is terminated sooner to counter-act the step deceleration of the vehicle wheel.

When $G_1VT$ or $G_2$ sets flip-flop 46, this also set flip-flop 62 through the Q output of flip-flop 46. The logic one output of AND gate 42, the modified $G_1$ output, and an output from clock 54 results in the output of gate 56 being pulsed at the clock frequency. The output of AND gate 56 feeds through OR gate 58 to pulse the return solenoid 24 at a frequency equal to the clock frequency. The pulsing action of return solenoid 24, coupled with the closing of the inlet solenoid 18, results in a slow pressure decay rate $P_1$ at the wheel cylinder 20. If the wheel deceleration continues to increase and exceeds the reference $G_2$, the return line solenoid is energized continuously by reference $G_2$ which is fed directly to OR gate 58, and fast pressure decay $P_2$ occurs. This fast decay is held until the wheel deceleration diminishes below the $G_2$ deceleration level at which time the slow pressure decay rate $P_1$ is re-established. By the discontinuance of the $G_2$ input signal, pressure decay rate $P_1$ is maintained until the wheel deceleration passes through the $G_1$ set point and is heading toward the positive acceleration condition. At this time the return line solenoid valve 24 is closed since both inputs to OR gate 58 are at a logic level zero. With a $\overline{G}_3$ acceleration input, and output of flip-flop 62 which has not been reset, and a clock input, then AND gate 60 feeds through OR gate 50 to pulse the inlet solenoid valve 18 thereby establishing the slow build rate $P_3$. This is due to the fact that the output of AND gate 48 is at a zero logic level because the modified input $G_1$ is zero. Therefore, the only signal that can pass through OR gate 50 is that derived from the output of AND gate 60. This input is of the same frequency and duration as the clock pulses fed into AND gate 60 from clock 54. The $G_3$ input to AND gate 60 is inverted as represented by the circle in the input line. Therefore, a $\overline{G}_3$ input will be received as a positive signal in AND gate 60 until the $G_3$ acceleration rate is obtained.

If the wheel acceleration increases above the $G_3$ reference level, AND gate 60 is inhibited, the inlet solenoid 18 de-energized, and a fast build rate $P_4$ will be established. Again, this build rate is not controlled, but is a function of the differential pressure between the master cylinder 12 and the wheel cylinder 20. Simultaneously, the Q output of flip-flop 46 falls to zero which resets the logic for the next cycle of the wheel. As the wheel speed falls below $G_3$ AND gate 60 is enabled and the inlet solenoid valve 18 will be pulsed by the clock and a slow pressure build rate $P_3$ will be repeated. This slow build rate $P_3$ will result in the brake torque exceeding the road torque and the wheel will again decelerate with the control cycle again being repeated. If the brake pedal is released, BK SW will obtain a logic level of zero resulting in the resetting of flip-flop 46 and flip-flop 52 providing they haven't already been reset, thereby re-establishing the initial conditions. Notice BK SW is fed through an inverter 62 which resets the flip-flop 52 and through an OR gate 64 which also has the $G_3$ input that can reset flip-flop 46. It is very important to note at this point that either $G_1VT$ or $G_2$ can activate the inlet and output solenoids 18 and 24. However, if $G_2$ occurs before the integration time of $G_1VT$ then the slow pressure decay rate $P_1$ will not occur and the brake pressure will decay according to fast pressure decay rate $P_2$.

The modified $G_1$ output is a method whereby the $G_1$ set point can be varied for either a lower or higher value of wheel deceleration. In the present case, the modified $G_1$ output will move the $G_1$ set point in the positive direction for modulation after the first cycle if the vehicle is on a low coefficient surface. Thereby the wheel deceleration set point for $G_1$ will be much lower after the first cycle. This enables the pressure decay rate of the second $P_1$ to be present for a longer period of time, thereby increasing the modulation response on a low coefficient surface. It is possible to set the vehicle operation for a low coefficient surface and vary the $G_1$ set point in the negative direction; or in other words, to assume the vehicle will be operating on a low coefficient surface and then, on subsequent cycles after the initial cycle, to increase the amount of wheel deceleration necessary to obtain the $G_1$ set point. These embodiments can be accomplished by a latching circuit with the $G_1VT$ input to AND gate 66 which sets flip-flop 68 when flip-flop 70 is in the reset condition with a $\overline{Q}$ output. Because the $\overline{Q}$ output of flip-flop 68 is fed into AND gate 72 with $G_2$ reference point, flip-flop 70 can never be set while flip-flop 68 is set. Likewise, the output of flip-flop 70 feeds back into AND gate 66 which will never allow flip-flop 68 to be set at the same time that flip-flop 70 is set. If $G_2$ occurs before $G_1VT$, which creates the assumption there is a low coefficient surface, flip-flop 70 would be set thereby giving a Q output which is represented by $G_1'$. Then $G_1'$ is fed into a comparator 74 and varies the reference point of the comparator circuit. Hence, when an output of the derivative amplifier 32, which is represented by $A_w$, is fed into the comparator 74 along with wheel deceleration reference signal $G_1$ an output is given that is termed the modified $G_1$ output. If $G_1VT$ occurs before $G_2$, flip-flop 70 can never be set and a $G_1'$ output never obtained. Therefore, the output of comparator 74 will be the same as the $G_1$ input. If a $G_1'$ output is obtained from flip-flop 70, this will move the modified $G_1$ output to a lower value of wheel deceleration after the first cycle. Notice the latching circuit just described is reset by the $\overline{Q}$ output of flip-flop 46. Therefore, the latching circuit re-cycles with each complete pressure modulation cycle.

Figure 4:
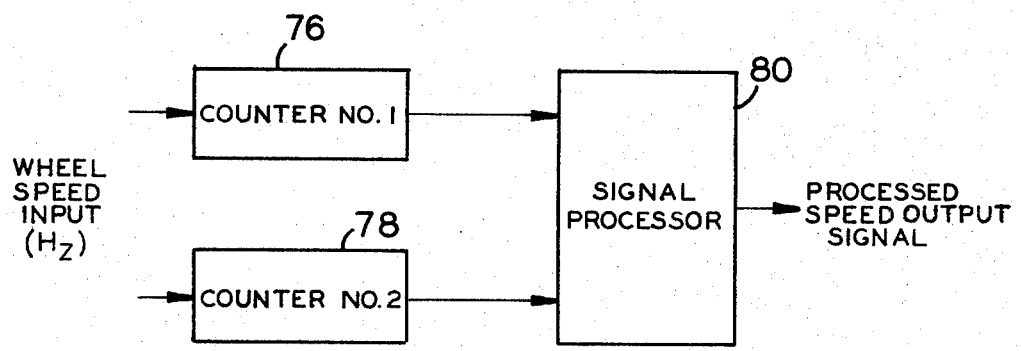
FIG. 4 is a block diagram of an alternate embodiment of the counter shown in FIG. 3.

A multi-channel control system can use a common clock, such as clock 54, to minimize the component count and result in lower unit cost with greater reliability. Referring to FIG. 4, there is shown a counter 76 and counter 78. Both counters receive their input signals from separate wheel speed sensors which represent the rotational velocity of two individual wheels, both of such wheels being controlled by a single pressure modulator. An example is the rear wheels of an automotive vehicle that is controlled by a single modulation unit. The outputs of the counters are fed into a signal processor 80 that may have either a high-select or a low-select system. The signal processor 80 is preferably made pursuant to the teachings of U.S. Pat. No. 3,535,004, owned by the assignee of the present invention and incorporated herein by reference.

A high-select system will give a processed speed output signal that represents the rotational velocity of the wheel turning at the higher velocity. A low-select system will give a process speed output signal representing the lower velocity of the two above-mentioned wheel velocities. Referring back to FIG. 3, the counter 30 could be replaced by FIG. 4 to give a processed speed output signal directly into the derivative amplifier 32. The type of wheel speed sensors that can be used to give the input to counter 30 could consist of conventional magnetic pickup devices or small economical Doppler radar units that are now becoming available on the commercial market. The Doppler radar wheel speed sensor would use a frequency variation between the signal transmitted and the signal received to give a pulse output which represents frequency variation. The frequency variation would be directly proportional to the rotational speed of the wheel.

What is claimed is:

1. In an adaptive braking system for a wheeled vehicle having a modulator for controlling braking pressure and a control unit for operating said modulator:
   means for generating a signal proportional to the rotational speed of a wheel of said vehicle;
   means for selecting first and second deceleration rates from said rotational signal of said vehicle wheel, and an acceleration rate from said rotational signal of said vehicle wheel;
   means for creating first and second output controls; said first output control being generated if said second deceleration rate does not occur within a given time period after said first deceleration rate is reached, and said second output control being generated if said second deceleration rate occurs during said given time period; and
   means for decreasing acceleration of said vehicle wheel with a third output control if said selected acceleration rate has been exceeded.

2. The invention recited in claim 1, wherein said means for selecting comprises an integrator and comparator circuit for selecting said first and second deceleration rates when said rotational speed signal decreases at given lower and higher rates, respectively, and for selecting said acceleration rate when said rotational speed signal increases at a given rate.

3. The invention recited in claim 2, wherein said means for creating comprises appropriate logic for generating said first and second output controls, said first output control being a pulsed signal and said second output control being a continuous voltage signal.

4. The invention recited in claim 3, wherein said appropriate logic also generates said third output control as a continuous voltage signal when said acceleration rate has been exceeded.

5. In an adaptive braking system for a vehicle having at least one braked wheel and a source of fluid braking pressure:
   means for generating a first signal proportional to the acceleration and deceleration of the braked wheel;
   means responsive to said first signal for generating a second signal when said wheel decelerates at a first rate, for generating a third signal when said wheel accelerates at a second rate, and for generating a fourth signal when said wheel accelerates at a predetermined rate;
   electrically operated valve means for controlling fluid communication to and from the brakes of the vehicle to decay and increase braking pressure;
   circuit means responsive to said signals for actuating said valve means, said circuit means including pulse generating means for pulsing said valve means;
   said circuit means being responsive to said second signal to pulse said valve means to decay braking pressure at a relatively low rate and to said third signal to actuate said valve means to permit braking pressure to decay at a greater rate.

6. The invention of claim 5:
said electrically operated valve means including a normally open inlet valve controlling communication between the vehicle brakes and said source of fluid pressure and a normally closed outlet valve for relieving braking pressure in said vehicle brakes;
said circuit means being responsive to said second signal to close said inlet valve and to pulse said outlet valve and to said third signal to maintain said inlet valve closed and to open said outlet valve.

7. The invention of claim 6:
said circuit means being responsive to termination of said third signal to pulse said outlet valve while maintaining said inlet valve closed to decay braking pressure at said relatively low rate, to termination of said second signal to close said outlet valve and to pulse said inlet valve to build braking pressure at a relatively low rate, and to said fourth signal to open said inlet valve while said outlet valve is closed to build pressure at a greater rate.

8. The invention of claim 7:
said circuit means including first gating means responsive to said second and third signals to produce an output, flip-flop means responsive to the output of said first gating means to close said inlet valve, second gating means responsive to said first gating means, to said second signal, and to said pulse generating means to produce a pulsating output operating said outlet valve in a pulsating manner.

9. The invention of claim 8:
said circuit means including third gating means responsive to said second gating means for operating said outlet valve in a pulsating manner and to said third signal to open said outlet valve continuously.

10. The invention of claim 5:
said circuit means being responsive to termination of said third signal to decay braking pressure at said lesser rate, to termination of said second signal to pulse said valve means to build braking pressure at a relative low rate and to said fourth signal to build braking pressure at a higher rate.

11. The invention of claim 5:
said circuit means including means for delaying actuation of said valve means for a time period after said second signal is generated.

12. The invention of claim 11:
said circuit means including means for determining the time integral of said first signal, said time period being equal to the time required for said time integral to attain a predetermined value.

13. The invention of claim 11:
said circuit means including means for immediately actuating said valve means if said third signal is generated during said time period to decay said braking pressure at said greater rate.

14. The invention of claim 5:
said rate of wheel deceleration required to generate said second signal being a predetermined value when said adaptive braking system cycles initially;
said circuit means including means for changing said predetermined rate of wheel deceleration required to generate said second signal upon subsequent cycles of said antiskid braking system during a brake application.

15. The invention of claim 14:
said circuit means including means for delaying actuation of said valve means for a time period after said second signal is generated;
said circuit means including means for immediately actuating said valve means if said third signal is generated during said time period to decay said braking pressure at said greater rate;
said means for changing said predetermined rate of wheel deceleration required to generate said second signal being responsive to generation of said third signal during said time period.

References Cited

UNITED STATES PATENTS

| | | | |
|---|---|---|---|
| 3,146,432 | 8/1964 | Johnson | 340—263 X |
| 3,454,777 | 7/1969 | Marcus | 250—231 SE |
| 3,494,671 | 2/1970 | Slavin et al. | 303—21 P |
| 3,497,269 | 2/1970 | Van Wicklin, Jr. | 303—21 F |
| 3,524,683 | 8/1970 | Stelzer | 303—21 F |
| 3,535,004 | 10/1970 | Howard et al. | 303—21 EB |
| 3,545,817 | 12/1970 | Yarber | 303—21 P |
| 3,547,501 | 12/1970 | Harned et al. | 303—21 BE |
| 3,556,610 | 1/1971 | Leiber | 303—21 P |
| 3,556,614 | 1/1971 | Steigerwald | 303—21 CG |
| 3,574,417 | 4/1971 | Howard et al. | 303—20 X |
| 3,499,689 | 3/1970 | Carp et al. | 303—21 P |

DUANE A. REGER, Primary Examiner

S. G. KUNIN, Assistant Examiner

U.S. Cl. X.R.

188—181 A; 303—20, 21 BE